US010982170B2

(12) United States Patent
Du et al.

(10) Patent No.: US 10,982,170 B2
(45) Date of Patent: Apr. 20, 2021

(54) EXTRACTION METHODS OF FIELD MUSKMELON SEED OIL

(71) Applicant: Anhui Agricultural University, Hefei (CN)

(72) Inventors: Xian-feng Du, Hefei (CN); Jinliang Chen, Hefei (CN)

(73) Assignee: ANHUI AGRICULTURAL UNIVERSITY, Hefei (CN)

( * ) Notice: Subject to any disclaimer, the term of this patent is extended or adjusted under 35 U.S.C. 154(b) by 0 days.

(21) Appl. No.: 16/826,181

(22) Filed: Mar. 21, 2020

(65) Prior Publication Data

US 2020/0299609 A1 Sep. 24, 2020

(30) Foreign Application Priority Data

Mar. 21, 2019 (CN) .......................... 201910216417.4

(51) Int. Cl.

| | |
|---|---|
| *C11B 1/06* | (2006.01) |
| *C11B 3/04* | (2006.01) |
| *B01D 21/26* | (2006.01) |
| *C11B 3/00* | (2006.01) |
| *B07B 15/00* | (2006.01) |
| *B01D 29/11* | (2006.01) |
| *A23D 9/04* | (2006.01) |
| *C11B 3/16* | (2006.01) |
| *C11B 1/04* | (2006.01) |
| *C11B 1/10* | (2006.01) |

(52) U.S. Cl.
CPC .................. *C11B 1/06* (2013.01); *A23D 9/04* (2013.01); *B01D 21/262* (2013.01); *B01D 29/11* (2013.01); *B07B 15/00* (2013.01); *C11B 1/04* (2013.01); *C11B 3/008* (2013.01); *C11B 3/16* (2013.01); *C11B 1/10* (2013.01)

(58) Field of Classification Search
CPC ..... C11B 1/04; C11B 1/06; C11B 1/10; C11B 3/00; C11B 3/008; C11B 3/16; B01J 21/262; B01D 29/11; B01D 21/262
See application file for complete search history.

(56) References Cited

U.S. PATENT DOCUMENTS

| | | | | |
|---|---|---|---|---|
| 9,120,996 | B2 * | 9/2015 | Dubois ...................... | C11C 1/08 |
| 2007/0281044 | A1 * | 12/2007 | Mueller .................. | A61K 36/87 |
| | | | | 424/727 |

FOREIGN PATENT DOCUMENTS

| | | | | |
|---|---|---|---|---|
| CN | 102199487 | * | 9/2011 | ............... C11B 1/06 |
| CN | 102965187 | * | 3/2013 | ............... C11B 1/04 |
| CN | 104130854 | * | 11/2014 | ............... C11B 1/06 |
| CN | 109527579 | * | 3/2019 | ............. A23D 9/007 |
| EP | 1074605 A1 | * | 2/2001 | ............... C11B 1/02 |

OTHER PUBLICATIONS

EP 1074605, Schneider, J. F., Process and apparatus for producing a cooking oil form rapseed, English abstract, 2 pages (Year: 2001).*
CN 102199487, Shimin Wu et al., Mehtod for producing virgin cold pressed Trichosanthes kirilowii Maxium seed oil, English translation, 6 pages (Year: 2011).*
CN 102965187, Wang Renkuan et al., Method for preparing tea seed oil in low-temperature cold pressing manner, English translation, 8 pages (Year: 2013).*
CN 104130854, Wang Qiaojiang et al., Cold oil pressing method, English abstract, 1 page (Year: 2014).*
CN 109527579, Chen Xiaohong et al., Chia seed oil product, preparation method and application thereof, English abstract, 1 page (Year: 2019).*
Mehra, M. et al., Estimation of nutritional, phytochemical and antioxidant activity of seeds of musk melon (*Ccumis melo*) and water melon (*Citrullus lanatus*) and nutritional analysis of their respective oils, Journal of Pharmacognosy and Phytochemistry, 3(6), pp. 98-102 (Year: 2016).*
Hou Zong-Kun, et al., Optimization of extraction process of *Trichosanthes kirilowii* maxim seed oil and evaluation of antioxidative activity, Science and Technology of Food Industry, 2017, pp. 261-265, Vol. 38, No. 06.

\* cited by examiner

*Primary Examiner* — Yate' K Cutliff
(74) *Attorney, Agent, or Firm* — Bayramoglu Law Offices LLC

(57) ABSTRACT

A method for preparing field muskmelon oil includes the following steps: S1, removing foreign matter, including: removing the foreign matter in field muskmelon seeds; S2, low-temperature pressing, including: performing the low-temperature pressing on the field muskmelon seeds after removing the foreign matter in step S1 to obtain an oil residue mixture; S3, filtering and removing impurities: filtering the oil residue mixture obtained by the low-temperature pressing in step S2 to remove the impurities to obtain a primary oil; and S4, centrifugal separation, including: centrifugally separating the primary oil obtained by filtering and removing impurities in step S3 to obtain the field muskmelon oil. The new method avoids using high-temperatures resulting in optimal yield of nutritional content and no harmful byproducts.

4 Claims, No Drawings

EXTRACTION METHODS OF FIELD MUSKMELON SEED OIL

CROSS REFERENCE TO THE RELATED APPLICATIONS

This application is based upon and claims priority to Chinese Patent Application No. 201910216417.4, filed on Mar. 21, 2019, the entire contents of which are incorporated herein by reference.

TECHNICAL FIELD

The present invention relates to the technical field of oil processing techniques, and more specifically, relates to a method for preparing field muskmelon oil.

BACKGROUND

Field muskmelon (*Cucumis melo* L. var *agrestis* Naud.) is a common annual vegetable with the advantages of drought tolerance, waterlogging tolerance, strong adaptability and large yield. Field muskmelon seeds are nutrient-dense, and contain a mass of oil, which can be used for oil processing. However, there is no method for preparing field muskmelon oil in the prior art. Prior oil processing techniques typically use some form of pressure application in combination with an increase in temperature.

SUMMARY

To solve the technical problem that there is no method for preparing field muskmelon oil in the prior art, and other methods for preparing oil are obtained only by high-temperature and pressing, the present invention provides an improved method for preparing field muskmelon oil.

To achieve the objective of the present invention, the present invention uses the following technical solution: a method for preparing field muskmelon oil, including the following steps:

S1, removing foreign matter, including: removing the foreign matters in field muskmelon seeds;

S2, low-temperature pressing, including: performing a low-temperature pressing on the field muskmelon seeds after removing the foreign matter in step S1 to obtain an oil residue mixture;

S3, filtering and removing impurities, including: filtering the oil residue mixture obtained by the low-temperature pressing in step S2 to remove the impurities to obtain a primary oil; and S4, centrifugal separation, including: centrifugally separating the primary oil obtained by filtering and removing impurities in step S3 to obtain the field muskmelon oil.

Preferably, the low-temperature pressing in step S1 includes first low-temperature pressing and second low-temperature pressing; each of the first low-temperature pressing and the second low-temperature pressing is performed at 40-60° C. for 12-20 min.

Preferably, the field muskmelon seeds are cleaned and dried at a constant temperature of 30° C. for 3-4 hours after removing foreign matters in step S1 and before the low-temperature pressing in step S2.

Preferably, the centrifugal separation is performed at a rotation speed of 4000-6000 r/min for 10-20 min.

Preferably, filtering and removing impurities in step S3 includes filtering by a bag filter.

Preferably, removing foreign matter in step S1 includes treating the field muskmelon seeds by a cleaning sieve, a magnetic separator, and a stone removing machine, respectively.

The advantages of the present invention are as follows:

(1) Field muskmelon seeds are used as the raw material in the present invention. Field muskmelon has a wide range of sources and low cost. The present invention provides an industrial approach for fully using the field muskmelon seeds. The obtained field muskmelon oil has a strong, pure and unique aroma, and greatly preserves active nutrients therein.

(2) The field muskmelon oil obtained by the present invention has a much higher nutritional value than that obtained by the high-temperature pressing method, and eliminates harmful substances. In the existing oil pressing techniques, a high-temperature treatment is used to pursue a high oil yield only. The present invention uses a low-temperature treatment throughout the process to obtain the field muskmelon oil with a relatively high content of squalene, tocopherol, vitamin E (VE), stigmasterol, β-sitosterol, and polyphenols, which preserves most all of the nutritional content of the field muskmelon oil. Harmful substances, such as benzopyrene, a common byproduct contained in the oil treated at high temperature, is absent from the oil treated by the present invention. In addition to the production of harmful byproducts, the higher temperature can also result in the gelatinization of impurities. Gelatinized impurities are commonly dispersed in various layers of the field muskmelon oil thus discoloring or blackening the oil. Moreover, the mass of the impurities becomes lighter, so that the impurities are still sparsely dispersed in the upper layer of the field muskmelon oil when it is centrifuged, which is difficult to be separated from the field muskmelon oil.

(3) In the preparation process of the present invention, the centrifugal separation technique is simple and practical, and can effectively remove impurities and moisture in field muskmelon oil, thereby achieving the purpose of rapid impurity removal. Without the need of a refining process, high-purity extraction of field muskmelon oil is achieved. The present invention has less equipment investment, relatively low energy consumption, and does not produce the three wastes (waste gas, waste water and industrial residue), which is environmentally friendly, and which makes the inventive process suitable for industrial production. The field muskmelon oil of the present invention is pressed at low temperature, and the particles of the impurities are larger in particle size and heavier in mass than the gelatinized impurities pressed at high temperature. Thus, the centrifugal device can separate impurities from the oil at relatively small power. The low-temperature pressing method and the subsequent centrifugal treatment in the present invention work collaboratively to prepare nutrient-rich field muskmelon oil without harmful substances at a relatively high oil-extraction rate. Furthermore, the present invention is simple and labor-saving in impurity separation.

DETAILED DESCRIPTION OF THE EMBODIMENTS

The technical solution of the present invention is further described in detail below in reference to specific embodiments.

Embodiment 1

100 g of field muskmelon seeds were selected. Crushed stones and mud blocks therebetween were first removed by a stone removing machine. Then, iron impurities were removed by a magnetic separator. Next, the seed shell and dust were removed by a cleaning sieve. After removing the foreign matter, the field muskmelon seeds were washed, and then dried at 30° C. for 4 hours in a constant temperature drying oven. Subsequently, the field muskmelon seeds were placed in a low-temperature spiral oil press machine for first pressing at 60° C. for 20 minutes. The cake obtained after the first pressing was pressed in the low-temperature spiral oil press machine for second pressing at 60° C. for 20 minutes. The crude oil treated by the first and second pressing was collected to obtain an oil residue mixture. The oil residue mixture was filtered to remove impurities by a bag filter to obtain primary oil. The primary oil was placed in a centrifuge at a speed of 6000 r/min for 20 minutes to separate oil from water and synchronously remove the impurities in the oil. 36.52 g of field muskmelon oil was obtained.

The oil yield of the field muskmelon seeds was calculated to be 36.52%. After the field muskmelon oil is detected by a gas chromatograph-mass spectrometry (GC-MS), a peak area normalization method was performed to obtain the following results: the field muskmelon oil contains 18.33 wt % of squalene, 15.39 wt % of tocopherol, 14.26 wt % of VE, 18.26 wt % of stigmasterol, 14.58 wt % of β-sitosterol, and 14.89 wt % of polyphenols An ultra-high performance liquid chromatography (UPLC) was used for detecting the field muskmelon oil, and the detection result indicates that no benzopyrene was detected. The dehydration rate of the field muskmelon oil was determined to be 88.25% by a moisture analyzer. The impurity removal rate of the field muskmelon oil was determined to be 98.28% by weighing and calculation.

Embodiment 2

100 g of field muskmelon seeds were selected. Crushed stones and mud blocks therebetween were first removed by a stone removing machine. Then, iron impurities were removed by a magnetic separator. Next, the seed shell and dust were removed by a cleaning sieve. After removing the foreign matter, the field muskmelon seeds were washed, and then dried at 30° C. for 3 hours in a constant temperature drying oven. Subsequently, the field muskmelon seeds were placed in a low-temperature spiral oil press machine for first pressing at 50° C. for 12 minutes. The cake obtained after the first pressing was pressed in the low-temperature spiral oil press machine for second pressing at 50° C. for 12 minutes. The crude oil treated by the first and second pressing was collected to obtain an oil residue mixture. The oil residue mixture was filtered to remove impurities by a bag filter to obtain primary oil. The primary oil was placed in a centrifuge at a speed of 5000 r/min for 15 minutes to separate oil from water and synchronously remove the impurities in the oil. 33.34 g of field muskmelon oil was obtained.

The oil yield of the field muskmelon seeds was calculated to be 33.34%. After the field muskmelon oil is detected by a gas chromatograph-mass spectrometry (GC-MS), a peak area normalization method was performed to obtain the following results: the field muskmelon oil contains 18.67 wt % of squalene, 15.24 wt % of tocopherol, 14.75 wt % of VE, 18.51 wt % of stigmasterol, 15.55 wt % of β-sitosterol, and 13.92 wt % of polyphenols An ultra-high performance liquid chromatography (UPLC) was used for detecting the field muskmelon oil, and the detection result indicates that no benzopyrene was detected. The dehydration rate of the field muskmelon oil was determined to be 81.26% by a moisture analyzer. The impurity removal rate of the field muskmelon oil was determined to be 90.75% by weighing and calculation.

Embodiment 3

100 g of field muskmelon seeds were selected and crushed stones and mud blocks therebetween were first removed by a stone removing machine. Then, iron impurities were removed by a magnetic separator. Next, the seed shell and dust were removed by a cleaning sieve. After removing the foreign matter, the field muskmelon seeds were washed, and then dried at 30° C. for 4 hours in a constant temperature drying oven. Subsequently, the field muskmelon seeds were placed in a low-temperature spiral oil press machine for first pressing at 40° C. for 15 minutes. The cake obtained after the first pressing was pressed in the low-temperature spiral oil press machine for second pressing at 40° C. for 15 minutes. The crude oil treated by the first and second pressing was collected to obtain an oil residue mixture. The oil residue mixture was filtered to remove impurities by a bag filter to obtain primary oil. The primary oil was placed in a centrifuge at a speed of 4000 r/min for 10 minutes to separate oil from water and synchronously remove the impurities in the oil. 31.58 g of field muskmelon oil was obtained.

The oil yield of the field muskmelon seeds was calculated to be 31.58%. After the field muskmelon oil is detected by a gas chromatograph-mass spectrometry (GC-MS), a peak area normalization method was performed to obtain the following results: the field muskmelon oil contains 19.42 wt % of squalene, 14.49 wt % of tocopherol, 15.66 wt % of VE, 17.96 wt % of stigmasterol, 15.89 wt % of β-sitosterol, and 14.68 wt % of polyphenols An ultra-high performance liquid chromatography (UPLC) was used for detecting the field muskmelon oil, and the detection result indicates that no benzopyrene was detected. The dehydration rate of the field muskmelon oil was determined to be 78.36% by a moisture analyzer. The impurity removal rate of the field muskmelon oil was determined to be 85.36% by weighing and calculation.

Comparative Example 1

100 g of field muskmelon seeds were selected. Crushed stones and mud blocks therebetween were first removed by a stone removing machine. Then, iron impurities were removed by a magnetic separator. Next, the seed shell and dust were removed by a cleaning sieve. After removing the foreign matter, the field muskmelon seeds were washed, and then dried at 30° C. for 4 hours in a constant temperature drying oven. Subsequently, the field muskmelon seeds were placed in an oil press machine for first pressing at 150° C. The cake obtained after the first pressing was pressed in the oil press machine for second pressing at 150° C. The crude oil treated by the first and second pressing was collected to obtain an oil residue mixture. The oil residue mixture was filtered to remove impurities by a bag filter to obtain primary oil. The primary oil was placed in a centrifuge at a speed of 6000 r/min for 20 minutes to separate oil from water and synchronously remove the impurities in the oil. 40.31 g of field muskmelon oil was obtained.

The oil yield of the field muskmelon seeds was calculated to be 40.31%. After the field muskmelon oil is detected by a gas chromatograph-mass spectrometry (GC-MS), a peak area normalization method was performed to obtain the following results: the field muskmelon oil contains 10.25 wt % of squalene, and 10.53 wt % of tocopherol, 11.21 wt % of VE. Other nutrients were not detected.

An ultra-high performance liquid chromatography (UPLC) was used for detecting the field muskmelon oil, and the detection result indicates 2.58 μg/kg of benzopyrene was detected. The dehydration rate of the field muskmelon oil was determined to be 85.34% by a moisture analyzer. The impurity removal rate of the field muskmelon oil was determined to be 95.56% by weighing and calculation.

Comparative Example 2

100 g of field muskmelon seeds were selected. Crushed stones and mud blocks therebetween were first removed by a stone removing machine. Then, iron impurities were removed by a magnetic separator. Next, the seed shell and dust were removed by a cleaning sieve. After removing the foreign matters the field muskmelon seeds were washed, and then dried at 30° C. for 3 hours in a constant temperature drying oven. Subsequently, the field muskmelon seeds after removing the foreign matters were placed in an oil press machine for first pressing at 180° C. The cake obtained after the first pressing was pressed in the oil press machine for second pressing at 180° C. The crude oil treated by the first and second pressing was collected to obtain an oil residue mixture. The oil residue mixture was filtered to remove impurities by a bag filter to obtain primary oil. The primary oil was placed in a centrifuge at a speed of 6000 r/min for 20 minutes to separate oil from water and synchronously remove the impurities in the oil. 43.26 g of field muskmelon oil was obtained.

The oil yield of the field muskmelon seeds was calculated to be 43.26%. After the field muskmelon oil is detected by a gas chromatograph-mass spectrometry (GC-MS), a peak area normalization method was performed to obtain the following results: the field muskmelon oil contains 8.65 wt % of squalene, and 6.72 wt % of tocopherol, 11.21 wt % of VE. Other nutrients were not detected.

An ultra-high performance liquid chromatography (UPLC) was used for detecting the field muskmelon oil, and the detection result indicates 2.58 μg/kg of benzopyrene was detected. The dehydration rate of the field muskmelon oil was determined to be 85.34% by a moisture analyzer. The impurity removal rate of the field muskmelon oil was determined to be 95.56% by weighing and calculation.

Comparing Embodiments 1-3 and Comparative Examples 1-2, it was determined that the higher the pressing temperature, the higher the oil yield. However, as the temperature rises, the beneficial substances such as squalene, tocopherol, VE, stigmasterol, 3-sitosterol, and polyphenols are all reduced, and the harmful substance benzopyrene is generated.

The above embodiments are merely used to describe the technical solution of the present invention, rather than limit thereto. Although the present invention has been described in detail with reference to the foregoing embodiments, those of ordinary skill in the art should understand that modifications to the technical solutions described in the foregoing embodiments or equivalent replacements of some technical features thereof can be done, but these modifications or replacements do not deviate the essence of the corresponding technical solutions from the spirit and scope of the technical solutions of the embodiments in the present invention.

What is claimed is:

1. A method for preparing field muskmelon oil, comprising the following steps:
    S1, removing foreign matter, comprising: removing the foreign matter in field muskmelon seeds; then removing a seed shell of the field muskmelon seeds, washing and drying the field muskmelon seeds at a constant temperature of 30° C. for 3-4 hours;
    S2, low-temperature pressing, comprising: performing the low-temperature pressing on the field muskmelon seeds using a low-temperature spiral oil press machine after removing the foreign matter in step S1 to obtain an oil residue mixture; wherein the low-temperature pressing comprises first low-temperature pressing and second low- temperature pressing, and each of the first low-temperature pressing and the second low-temperature pressing is performed at 40-60° C. for 12-20 min;
    S3, filtering and removing impurities, comprising: filtering the oil residue mixture obtained by the low-temperature pressing in step S2 to remove the impurities to obtain a primary oil; and
    S4, centrifugally separating, comprising: centrifugally separating the primary oil obtained by filtering and removing the impurities in step S3 to obtain the field muskmelon oil.

2. The method for preparing the field muskmelon oil according to claim 1, wherein the centrifugally separating in step S4 is performed at a rotation speed of 4000-6000 r/min for 10-20 min.

3. The method for preparing the field muskmelon oil according to claim 1, wherein filtering and removing impurities in step S3 comprises filtering by a bag filter.

4. The method for preparing the field muskmelon oil according to claim 1, wherein removing foreign matter in step S1 comprises treating the field muskmelon seeds by a cleaning sieve, a magnetic separator, and a stone removing machine, respectively.

* * * * *